Oct. 19, 1965    M. GARFINKLE    3,212,882
METHOD AND APPARATUS FOR OXYGEN STEELMAKING
Filed March 14, 1962    3 Sheets-Sheet 1
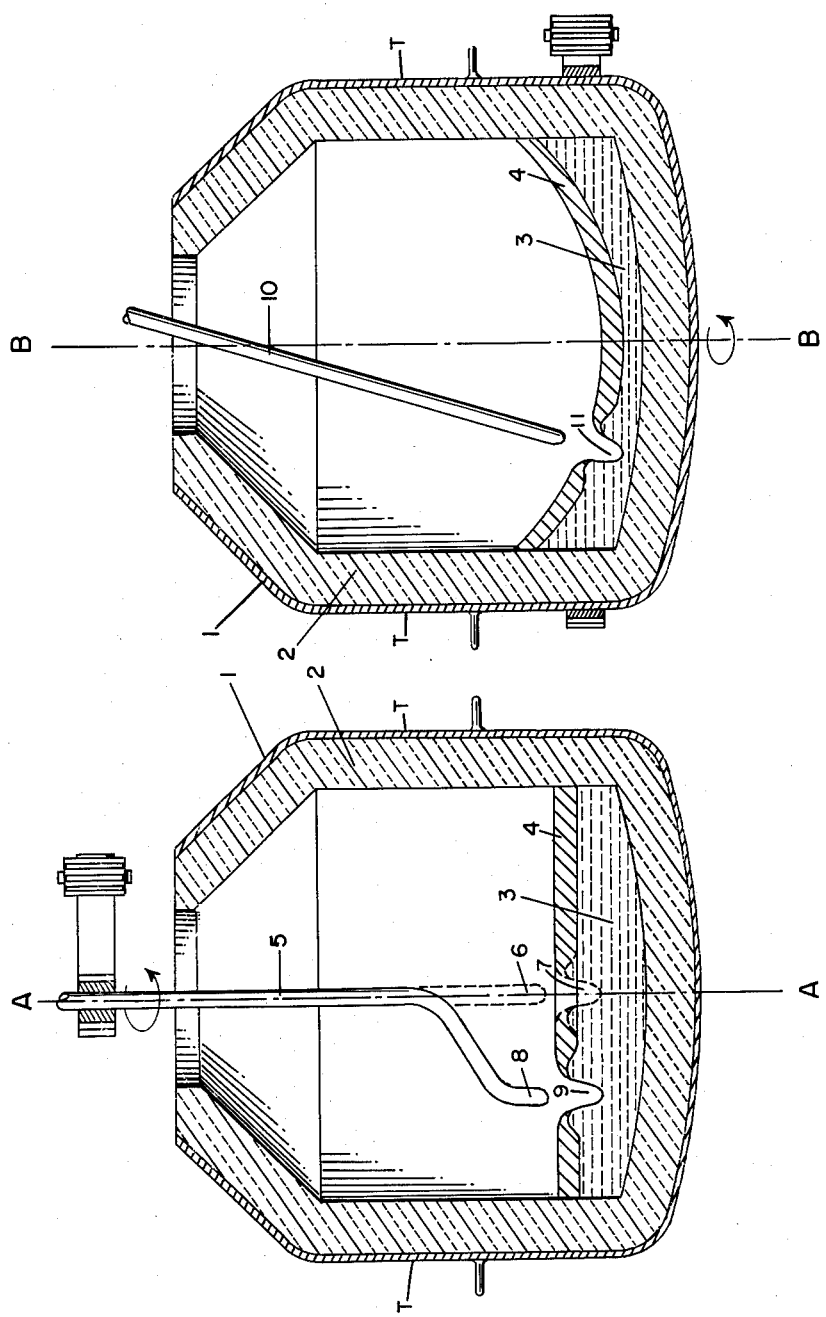
INVENTOR.
MARVIN GARFINKLE
BY
ATTORNEY

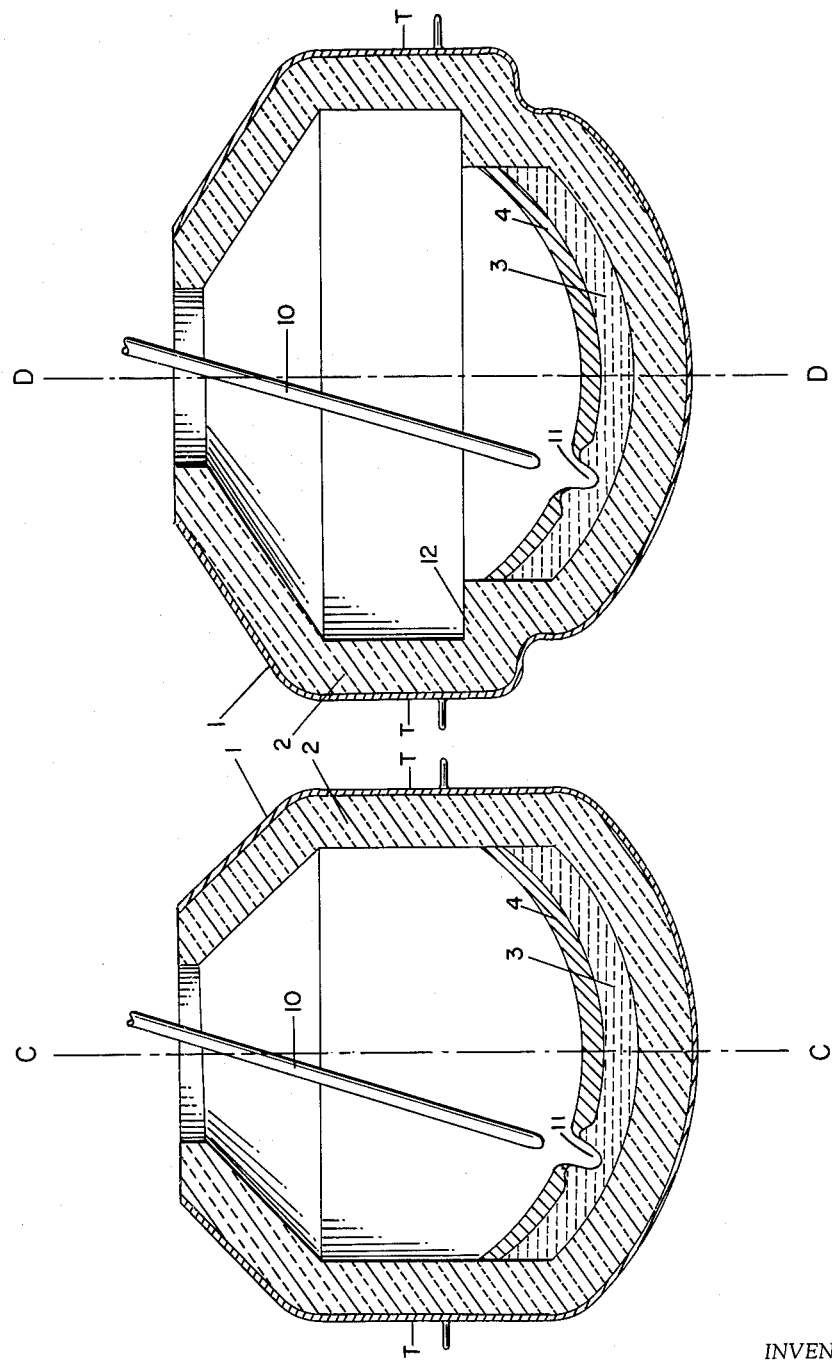

INVENTOR.
MARVIN GARFINKLE

BY

ATTORNEY

United States Patent Office 3,212,882
Patented Oct. 19, 1965

3,212,882
METHOD AND APPARATUS FOR OXYGEN STEELMAKING
Marvin Garfinkle, Philadelphia, Pa.
(P.O. Box 4704, Fairview Park, Cleveland, Ohio)
Filed Mar. 14, 1962, Ser. No. 179,711
8 Claims. (Cl. 75—60)

The present invention relates to improvements in basic oxygen steelmaking and, more particularly, to a method and apparatus for refining molten iron in a top blown furnace.

The use of substantially pure oxygen in the refining of pig iron into steel has increased considerably in the past decade. The use of oxygen in the open-hearth process is now well established. However, the most significant growth in oxygen steelmaking capacity in recent years involve processes in which no extraneous fuel is used, in particular, the top-blown oxygen converter.

The usual basic oxygen converter comprises a closed bottom cylindrical vessel with a truncated conical roof. The vessel is constructed of steel plate and is internally lined with refractory ceramic brick. The vessel is supported on trunnions, allowing it to be tilted about a horizontal axis for charging and tapping. After charging with pig iron and slag forming ingredients, the furnace is returned to the vertical position and the charge is blown with substantially pure oxygen by means of a vertical water-coled oxygen lance suspended over the molten bath, which consists of a metal layer with a slag covering.

The effect of an oxygen jet on molten metal and slag is very complicated, as is the case with most interfacial phenomena. The most important consideration is that a vertical high-velocity gas jet can penetrate rather deeply into a liquid metal and slag pool, creating a parabolic cavity in the metal and pushing the slag away from the mouth of the cavity. The gas stream impinging on the metal layer causes liquid metal to be ejected from the cavity into the gas stream and thereby to be lost from the furnace as dust. The deeper the slag layer, the greater is the gas velocity necessary for the oxygen to penetrate through the slag and contact the metal. Such contact is necesary for only by an intimate gas-metal interaction can an efficient refining action take place.

The refining processes taking place in the oxygen converter can be divided into three categories according to the metalloids involved. In the first category is carbon, which is oxidized within the metal pool and leaves the bath as carbon monoxide gas. In the second category can be placed silicon and manganese, which are likewise oxidized within the metal pool, but they leave the metal as a liquid oxide which rises to the surface of the bath. In the third category are placed sulphur and phosphorus, which can be removed only by their contacting the slag layer floating on the metal pool and being incorporated therein. The slag must be specially prepared to receive these elements.

It is evident that for all three categories, the reaction rates are dependent on how rapidly the reactants or products are carried to or from an interface. For the first two categories, the rate at which oxygen-saturated metal leaves the oxygen-metal interface and is replaced with unreacted metal will determine the rate of these reactions, and for the third category, the rate at which the dissolved metalloids contact the slag-metal interface will determine the rate at which they leave the metal bath. The reaction rates for the first two categories can be increased considerably by increasing the oxygen velocity which will deepen the cavity and agitate the metal pool, but the increased splashing will increase the dust loss. The rate at which the metalloids of the third category are removed can be increased by decreasing the depth of the metal bath and increasing the slag-metal interfacial area, but such a procedure will greatly increase the size of the furnace without increasing its capacity.

The term "furnace vessel" is used herein in the same sense as the term "converter."

The primary object of this invention resides in providing a method and an apparatus to carry out the method for establishing significantly greater efficiency in the utilization of oxygen in oxygen steelmaking.

A further object of this invention is to provide a method and apparatus to increase the reaction kinetics in basic oxygen steelmaking without increasing the oxygen consumption.

A still further object of this invention is to provide a method and apparatus for oxygen steelmaking in which the rate of kinetic reaction is accelerated in all of the aforedescribed categories.

Further and more specific objects of the present invention will in part be obvious and in part will be specifically pointed out in the following description of the invention. For a better understanding of the invention reference may be had to the accompanying drawings wherein:

FIGURE 1 is a vertical cross-sectional view of an oxygen steelmaking furnace in accordance with this invention;

FIGURE 2 is a view similar to FIGURE 1 illustrating a rotatable vessel;

FIGURE 3 is a vertical cross-sectional view illustrating a modified vessel;

FIGURE 4 is a view of this invention similar to FIGURE 3, showing the vessel with a slag removing shelf.

Figure 8:
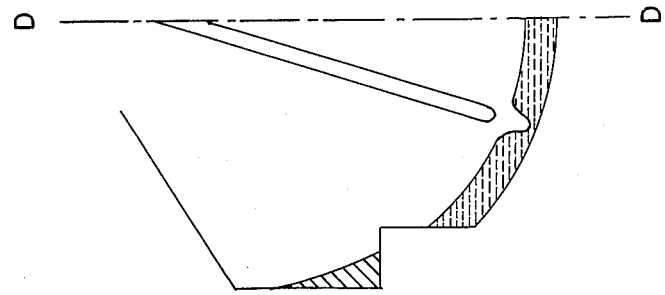
FIGURES 5 to 8 illustrate, schematically, the oxygen steelmaking furnace of FIGURE 4, at various stages of operation.

Referring now to FIGURE 1, the furnace comprises a steel shell 1 possessing a refractory lining 2 suitably constructed so as to prevent damage to the shell by the liquid metal pool 3. The liquid metal is covered with a slag layer 4. In a furnace of conventional design, the water-cooled oxygen lance 5 is vertically positioned above the molten pool so that the axis of the lance coincides with the vertical symmetry axis of the furnace AA, as is illustrated by the dotted lines 6. In order for the refining action to be complete, dissolved oxygen must migrate from the point at which oxygen enters the bath at 7 to the edge of the metal pool. This migration will be primarily by convection currents set up in the liquid pool by the impinging oxygen stream at 7. However, below a certain depth the metal pool is little disturbed by these convection currents, and a stagnant layer exists. The rapidity at which oxygen saturates the bath is dependent both on how rapidly the convection currents carry unreacted metal to the vicinity of the cavity and on how rapidly these convection currents carry oxygen-saturated metal to the extremities of the bath, which is dependent on the distance between the cavity and the edge of the bath, the radius $r_0$.

In the present invention, the tip of the oxygen lance is offset from the axis of the furnace by a distance $r$ and is rotated, by means of a conventional mechanism about the axis AA, so that the oxygen jet circumscribes on the bath surface a circle of radius $r$ whose center is on the axis AA. The effect of rotating the lance, and therefore moving the lance tip 8, is to move the cavity 9 along the surface of the bath. Since the cavity itself moves through the bath, the rapidity at which oxygen enters the bath is virtually independent of the rate at which unreacted metal migrates to the cavity. In addition, to saturate the bath, the oxygen-saturated metal need not migrate the full radius of the bath $r_0$, but only the distances $r$ and $r_0-r$, which are shorter than the distance $r_0$. Increasing the rate at which oxygen migrates throughout the bath will primarily affect the reactions of the first two categories, which are dependent on the oxidation of metalloids within the bath. In particular, the carbon boil should begin sooner. While the reactions of the third category are not directly affected by the increased rate of saturation, the increased agitation of the bath due to the moving cavity will increase the frequency of contact between the metalloids and the slag layer.

FIGURE 2 illustrates an oxygen steelmaking furnace of substantially the same configuration as the furnace of FIGURE 1. However, instead of rotating the oxygen lance 10 so as to move the cavity 11 along the surface of the bath, the furnace vessel itself is rotated, by means of a conventional mechanism, about the axis BB. Though it may appear that rotating the vessel is equivalent to rotating the lance, actually the reactions within the bath are affected by rotation. Since the liquid bath, both slag and metal, will rotate with the same angular velocity as does the vessel, their surfaces will assume the curvature of a paraboloid of revolution about the axis of rotation, as is illustrated in FIGURE 2. The curvature of the surface is dependent only on the angular velocity of the fluids involved, and not on their density, therefore the curvature of the slag-metal interface will be the same as the curvature of the gas-slag interface, and the vertical depth of the slag will be constant across the bath. The curvature of the liquid surface can be represented by the parabolic equation. The following equation relates the bath heights at its edge to that at its center $$h_0 = 1.7 \times 10^{-4} (RPM)^2 r_0^2$$

The quantity $h_0$ is the height in feet of the bath at its edge above the level of the bath at its center of rotation, RPM is the rotational speed of the bath in revolutions per minute, and $r_0$ is the radius of the bath in feet. As an example, consider a vessel with a ten foot radius bath rotating at an angular velocity of 10 RPM. The level of the bath at its edge will be 1.7 feet higher than the level of the bath at its center. This example illustrates that low angular velocities can result in considerable curvature in the liquid surface.

A unique relationship exists between the depth of the bath at its center while stationary $h_s$ and the depth at its center while rotating $h_r$.

$$h_r = h_s - h_0/2$$

In the above example, if the depth of the stationary metal bath would be four feet, then the depth of the bath rotating at 10 RPM would have been 3.15 feet, less than three-quarters of its stationary depth. The height $h_0$ is dependent on the square of the angular velocity, and therefore increases considerably with small increases in angular velocity. If the angular velocity in the above example is increased by one half to 15 RPM, then the depth of the bath will be decreased by 1.9 feet, almost one-half of its stationary depth. Thus, by rotating the furnace, the depth of the metal bath can be decreased without increasing the size of the furnace. In effect, the walls of the furnace are utilized to hold liquid metal. Since the depth of the bath is decreased, the depth of the stagnant layer is also decreased, and the bath can be saturated with oxygen more rapidly. The height $h_0$ is also dependent on the square of the radius of the furnace, and therefore a large furnace need not rotate as rapidly as a small furnace to attain the same decrease in bath depth.

Since the curvature of the liquid surface is dependent only on the angular velocity of the rotating furnace, the bath surface in a furnace designated for a specific angular velocity will possess a unique curvature. Therefore, by designing the floor of the furnace with the proper curvature, the depth of the bath can be maintained constant across its diameter, as is illustrated in FIGURE 3.

In altering the surface configuration of a liquid from a flat disc to that of a paraboloid, it is evident that the surface area will be increased. For the case of a rotating slag-metal system, the slag-metal and the gas-slag interfacial areas will increase equally. The ratio of the surface area of the rotating liquid $S_r$ to the surface area of the stationary liquid $S_s$ is expressed by the following equation:

$$\frac{S_r}{S_s} = \frac{5.7 \times 10^6}{(RPM)^4 r_0^2} [(11.6 \times 10^{-8} (RPM)^4 r_0^2 + 1)^{3/2} - 1]$$

Considering again the example used previously, for a furnace with a radius of ten feet rotating with an angular velocity of 15 RPM, the surface area ratio $S_r/S_s$ is equal to 1.12; i.e. the surface area of the rotating slag-metal interface is 1.12 times as great as the stationary slag-metal interface.

Reactions of the third category, which are primarily dependent on the slag-metal interfacial area, will therefore proceed more rapidly in a rotating furnace than in a stationary furnace of the same capacity. In addition, the increased gas-slag interfacial area will increase the rate of oxygen diffusion into the slag layer.

In the case of the stationary furnace of FIGURE 1, the speed at which the gas jet passes over the bath surface for the most efficient utilization of oxygen can be readily controlled by regulation of the rotational speed of the lance. However, in the case of the rotating furnaces, their rotational speed, and therefore the speed at which the gas jet passes over the bath surface, will be regulated to maintain a desirable surface configuration on the liquid bath. These furnaces, therefore, may be rotated at speeds that differ considerably from that necessary for efficient oxygen utilization. This condition can be remedied however, by utilizing a rotating lance of the configuration illustrated by FIGURE 1 in conjunction with the rotating furnaces. With this arrangement, the speed at which the gas jet passes over the surface of the bath can be maintained independent of the rotational speed of the furnace. The axis of rotation of the lance need not coincide with the axis of rotation of the furnace.

While rotating the oxygen lance or furnace vessel itself will enhance the rates of the reactions responsible for the refining action in the oxygen converter, such motion does not contribute in any way to the retention of metalloids in the slag which were removed from the metal bath. For example, phosphorus removal is favored by low temperatures. Therefore, its removal from the metal pool is most rapid at the beginning of the refining period while the bath temperature is still relatively low. However, as the bath temperature rises, which favors sulphur removal, there is a tendency for the phosphorus to revert back to the metal phase. The reverse reaction can of course be prevented by physically isolating the phosphorus-containing slag from the metal phase. In the usual practice, such a procedure would involve removing the phosphorus-containing slag from the converter and replacing with a new slag, but this procedure interrupts the refining operation and is time consuming. However, by making full use of the principles of a rotating furnace, it is possible to isolate the metalloid-containing slag from the metal surface without interrupting the refining operation. Such a procedure would require a furnace with a configuration illustrated in FIGURE 4. This furnace is symmetrical about the axis of rotation DD. The vessel bottom possesses a depression or hearth of radius $r_0$ which defines the inner edge of the shelf 12 of width $w$.

FIGURES 5 through 8 illustrate the interior surface of a converter with the configuration of FIGURE 4. If the furnace of FIGURE 4 is rotating at some angular velocity RPM′, the surface curvature of the slag-metal and the gas-slag interfaces will assume a configuration similar to that illustrated. In fact, the surface curvature of any fluid in the vessel will assume the same configuration, since this curvature is dependent only on the angular velocity RPM′.

If the angular velocity of the furnace is increased beyond

Figure 7:
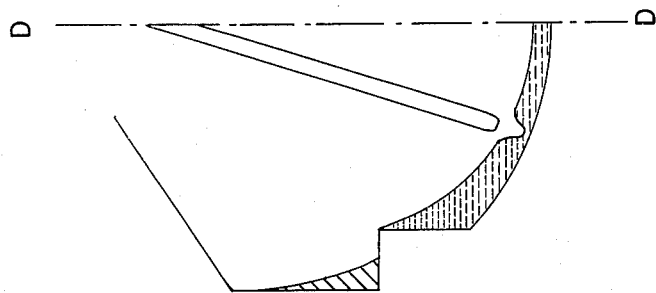
Figure 6:
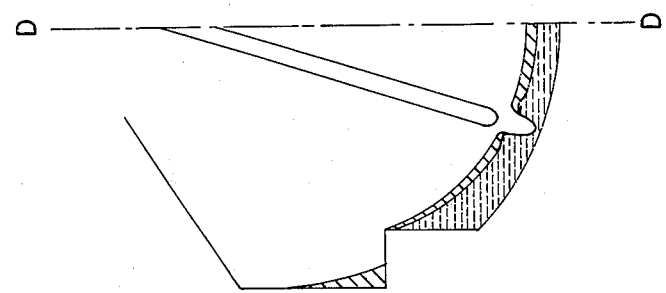
Figure 5:
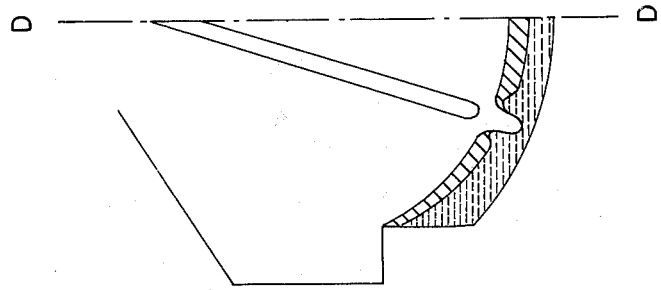

RPM' to RPM", the level of the liquid at the edge of the hearth will rise still further above its level at the center, thus decreasing the height of the shelf above the slag-metal interface. When the height of the shelf above the slag-metal interface is equal to the depth of the slag layer, the surface configuration of the bath will be that illustrated in FIGURE 5, where the gas-slag interface is in contact with the edge of the shelf. Further increases in the angular velocity beyond RPM" will cause slag to spill over the edge of the shelf, as illustrated in FIGURE 6. At an angular velocity RPM''', all of the slag will have passed onto the shelf and the liquid metal surface will be in contact with the edge of the shelf, as is illustrated in FIGURE 7. If the angular velocity is now decreased to RPM', the liquid metal surface will assume the same curvature as the slag-metal interface of FIGURE 4, and the slag on the shelf will move towards the edge of the shelf. The angular velocity at which the slag will flow off the shelf is dependent on the slag capacity of the shelf and the volume of slag on the shelf. The approximate slag capacity of the shelf V in cubic feet can be calculated from the following equation $$V = 2.7 \times 10^{-4} (RPM)^2 w^2 (w + 2r_0)^2$$

where $w$ is the width of the shelf in feet. The above equation illustrates that as the angular velocity decreases, the slag capacity also decreases. At an angular velocity at which the slag volume on the shelf exceeds the slag capacity of the shelf, the slag will flow off.

It is evident from FIGURE 8 that it is now possible to add a second slag to the converter independent of the first slag, which is isolated on the shelf. In fact, if the slag capacity is great enough, it is possible to promote the second slag onto the shelf and add a third slag to the furnace. This process can be repeated as long as there is sufficient slag capacity on the shelf to hold the successive slags. Alternately, it may be preferable to maintain the furnace angular velocity at a constant value such as is illustrated in FIGURE 6, so that the slag, as it forms, continuously passes over the edge of the shelf. By blowing lime and fluxes into the furnace through the oxygen lance, a low metalloid slag can be constantly maintained on the metal surface.

It may even be possible to remove metal impurities from the bath with the use of the procedure outlined above. For example, copper removal from a liquid steel bath is extremely difficult because the copper tends to revert back to the metal phase when its concentration in the slag exceeds a very low value. However, by continuously removing the slag from the bath in a rotating furnace, the concentration of copper in the slag in contact with the metal bath can be maintained at a very low value. The proper slag-forming ingredients for copper removal could be blown into the furnace through the oxygen lance.

Evidently, when the furnace is stationary for tapping, the slag capacity of the shelf will be zero, and all of the slag on the shelf will flow down onto the metal surface. Whether the metalloids in the slag reenter the metal bath will depend primarily on the slag-metal contact time and on the temperature and viscosity of the slag. Since the slag contacts the metal phase only during the period of tapping, no significant amount of metalloids should reenter the metal phase. In addition, the temperature of the slag can be lowered and its viscosity raised by adding lime directly to the metal surface. The slag flowing off the shelf will be readily cooled and thickened by the lime layer.

It is possible to retain the slag on the shelf even after rotation has ceased simply by providing a depression in the shelf whose capacity is greater than the volume of slag on the shelf. In this case, the slag would make contact with the metal only when the furnace has been tapped by being tilted about the horizontal axis TT.

While the tapping procedure for a rotating furnace will be substantially the same as is the procedure for a non-rotating furnace, the charging procedure may differ somewhat. Though it will be possible to initially charge the furnace with molten metal and slag-forming ingredients while the furnace is tilted, it will be necessary to charge scrap and the ingredients for subsequent slags while the furnace is vertical so as not to disrupt the rotation of the furnace. Charging the furnace in the vertical position while it is in rotation will necessitate a chute arrangement to the mouth of the furnace and a device at the end of the chute to direct the slag ingredients or scrap vertically downwards, so that they do not contact the shelf or the walls of the furnace. The chute arrangement must of course be withdrawn during blowing.

In the furnaces described by this invention, efficient utilization of oxygen is accomplished by moving the oxygen stream with respect ot the bath surface, and thereby more rapidly subjecting the bath to the refining action of the oxygen stream than would be possible by convection or diffusion alone. Also it is possible to isolate the slag from the metal phase in a rotating furnace, and thereby control reactions that tend to contaminate the bath.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:
1. An oxygen steelmaking furnace comprising: a furnace vessel having a top access opening and solid bottom of a substantially paraboloidal surface configuration; an oxygen supply lance extending through said opening and suspended within the vessel in spaced relation proximate to the bottom thereof, said lance including an outlet for discharging said oxygen into said vessel at a location spaced from the central axis of said vessel; and means operatively engaging said vessel for rotating it about its central axis.

2. An oxygen steelmaking furnace comprising: a furnace vessel having a top access opening and a side wall providing a depression extending transverse in relation to the central axis of said vessel and constituting a shelf for receiving impurities; an oxygen supply lance extending through said opening and suspended within the vessel in spaced relation proximate to the bottom thereof, said lance having an outlet for oxygen within said vessel located in spaced relation to said central axis; and means operatively disposed for establishing relative rotation between said lance and said vessel.

3. An oxygen steelmaking furnace according to claim 2, wherein said depression is continuous and establishes an annular shelf.

4. A method for refining molten iron in a steelmaking furnace, which comprises: depositing molten iron and slag forming material into a furnace vessel; continuously providing a stream of oxygen into said vessel and against the bath of molten material for establishing at the point of contact a cavity; rotating the vessel for continuously moving the cavity on the surface of said bath along a circular path spaced from the central axis of the vessel to agitate the bath; and the vessel being rotated at a predetermined speed for establishing a substantially uniform depth of said material in the vessel.

5. An oxygen steelmaking furnace comprising: a furnace vessel having a top access opening, generally vertically extending walls and a solid bottom surface; an oxygen supply lance extending through said opening and suspended within the vessel in spaced relation proximate to the bottom thereof; said lance having an outlet for oxygen within said vessel located in spaced relation to the central axis of said vessel; and means operatively disposed for rotating said vessel.

6. An oxygen steelmaking furnace comprising: a furnace vessel having a top access opening, a substantially cylindrical wall and a solid bottom of a substantially paraboloidal surface configuration, said vessel including an internal annular shelf spaced from said bottom and extending substantially transverse with respect to the central axis of said vessel, the width of said shelf being defined by the difference between the radius of said cylindrical wall and the radius of the paraboloidal bottom, each of said radii extending from said central axis; and an oxygen lance extending through said opening and suspended within the vessel in spaced relation proximate to the bottom thereof; and means operatively disposed for establishing relative rotation between said lance and said vessel.

7. An oxygen supply furnace according to claim 6, wherein said lance includes an outlet for discharging oxygen at a location spaced from the central axis of said vessel.

8. A method for refining molten iron in a steelmaking furnace, which comprises: depositing molten iron and slag forming material into a furnace vessel; continuously providing a stream of oxygen into said vessel and against the bath of molten material for establishing at the point of contact a cavity; rotating the vessel for continuously moving the cavity on the surface of said bath along a circular path spaced from the central axis of the vessel to agitate the bath to establish a greater frequency of contact between the molten mass and the slag than when the cavity is stationary; and isolating metalloids containing slag from the metal surface by centrifugal forces of the rotating vessel without interrupting the refining process; said vessel being rotated at a speed effective for depositing the slag upon a shelf within the vessel.

References Cited by the Examiner
UNITED STATES PATENTS

| | | | |
|---|---|---|---|
| 395,455 | 11/88 | Peck | 266—37 |
| 2,862,811 | 12/58 | Eketorp et al. | 75—60 |
| 3,015,554 | 1/62 | Rummel | 259—4 X |

FOREIGN PATENTS

| | | |
|---|---|---|
| 700,224 | 11/53 | Great Britain. |
| 819,414 | 9/59 | Great Britain. |

MORRIS O. WOLK, *Primary Examiner.*

JAMES H. TAYMAN, JR., *Examiner.*